United States Patent

Dillenburger

[15] 3,678,195

[45] July 18, 1972

[54] SMEARING EFFECT ATTENUATION

[72] Inventor: Wolfgang Dillenburger, Darmstadt, Germany

[73] Assignee: Fernseh GmbH, Darmstadt, Germany

[22] Filed: June 18, 1971

[21] Appl. No.: 154,635

Related U.S. Application Data

[63] Continuation of Ser. No. 812,228, April 1, 1969, abandoned.

[52] U.S. Cl. ....................178/7.2

[51] Int. Cl. ....................H04n 5/34

[58] Field of Search ....................178/5.4 R, 7.1, 7.2

[56] References Cited

UNITED STATES PATENTS

| | | | |
|---|---|---|---|
| 2,222,934 | 11/1940 | Blumlein | 178/6.8 |
| 2,784,342 | 3/1957 | Overbeck | 315/21 |
| 2,911,463 | 11/1959 | Kretzmer | 178/6 |
| 3,175,037 | 3/1965 | Padgitt | 178/7.85 |
| 3,499,109 | 3/1970 | Kihara et al. | 178/7.2 |
| 2,797,257 | 6/1957 | Law | 178/5.4 |
| 3,507,981 | 4/1970 | Eilenburger | 178/5.2 |

*Primary Examiner*—Robert L. Richardson

[57] ABSTRACT

When sweeping lines in a first field of interlaced fields on a television camera photosensitive storage layer adjacent portions of lines in a second field also are swept. Smearing effect or image carryover is reduced by reducing migration or leakage of charge between unswept lines of the second field and swept lines of the first field. Preferably horizontal lines are narrowed by anamorphically projecting images on the coating, thus shrinking images vertically, while maintaining their horizontal dimensions. Alternatively beams may be oscillated vertically while sweeping horizontally, or vertical cross sectional dimensions of beams may be increased.

12 Claims, 5 Drawing Figures

Inventor:

Wolfgang Dillenburger by Littlepage, Quaintance, Wray & Aisenberg

Attorneys

SMEARING EFFECT ATTENUATION

This application is a continuation of application Ser. No. 812,228, filed Apr. 1, 1969 for Smearing Effect Attenuation by Wolfgang Dillenburger. The priority of German Pat. application P 17 62 074.5, filed Apr. 2, 1968 is claimed in the present case.

BACKGROUND OF THE INVENTION

The invention outlined below is a method which renders possible a substantial attenuation of the smearing effect produced by photoconductivity type storage camera tubes that are provided with a storage layer.

The invention applies particularly to those photo conductivity storage camera tubes that have a storage layer of lead oxide and a blocking (or barrier) layer wherein scanning is done according to the interlaced scanning process. In interlaced scanning systems each picture is fully explored by successively scanning lines in a plurality of fields, the lines of each field falling in spaces left between lines of other fields. Conventional interlaced systems are double interlaced, using two interlaced fields with a line of one field interlaced or interposed between adjacent lines of the other field.

Where storage camera tubes of the commonly used type are involved, the practice followed to obtain a picture signal can be summarized as follows. The storage plate, which contains the electrical image of the object to be televised, is scanned by an electron beam that moves progressively across the storage plate.

In contrast, camera tubes of the photoconductivity type, a variety that is gaining ground in the market, project an optical picture of the object to be televised directly on the photo semiconductor that serves as energy storage or accumulation electrode.

Photoconductivity storage camera tubes have the advantage of simplicity in construction and operation. On the other hand, their most objectionable disadvantage is the so-called "-smearing effect." It is a particularly annoying phenomenon when motion scenes are televised. The smearing effect results from the following sequence of events. The desired picture signal is obtained at any given picture period through scanning of the storage layer. Weaker signals belonging to that given picture period do not disappear but, instead, still influence transmission during the next periods. This happens even if the televised object has not been exposed again, say, because of a change in its position during a subsequent period.

Many attempts have been made to reduct, or completely eliminate the great disadvantage of the smearing effect which is associated with camera tubes of the photoconductivity type. But in spite of the attempts, attenuation of the smearing effect has not been materially successful. That is particularly true when low light intensity pictures with small luminous density are involved. It applies both for "Vidicon" type camera tubes and for "Plumbicon" type, the latter being camera tubes provided with lead oxide layers in combination with barrier or blocking layers.

A technique already applied against the smearing effect is to avoid full utilization of the photosensitive layer of the camera tube. This can be done by choosing a raster or scanning spot smaller than the one normally used. To achieve this, one operates with a lens having a shorter focal length that gives a greater relative apperture in comparison to the commonly used lenses. However, that well known technique is applicable only to a limited extent since the relative aperture in lenses currently used is rather small. Moreover, that method does not take account of a serious circumstance, namely, that the charge which remains between the lines during the scanning process contributes to the smearing effect.

SUMMARY OF THE INVENTION

A fundamental characteristic of the present invention is that it involves a technique through which the track of a horizontally sweeping scanning beam becomes greater in relation to picture height, or in which the picture size becomes smaller in the vertical direction than in the horizontal direction which corresponds to the aspect ratio of the televised image.

Generally speaking, the smearing effect must be attributed partially to those not yet fully revealed properties of the photo barrier or blocking layer of the energy storage electrode. However, some known causes of the smearing effect are the incomplete discharge of the storage electrode at the point where the electron beam meets it, and the inertia symptoms of the current paths between the two sides of the photosensitive surface, that is the side covered by the electron beam, and the other side adjacent to the signal electrode.

An important element of the invention is the finding that an additional cause, and a very significant one at that, of the smearing effect has to be sought in the leakage of the picture element charge transversely to the direction of the current paths between the two sides of the photo sensitive surface in the photosemiconductor. When the scanning takes place according to the interlaced scanning method, the leakage leads to two things. The charge which still exists between the lines of the first partial image - a charge that has been stored since the previous scanning - is partially carried over to the scanning lines of the first partial image. In that manner, a residual charge appears on the already scanned lines of the first partial image field. The final outcome is a spurious residual signal.

Through the present invention the origination of the residual charge is significantly reduced, and therefore, that particular cause of the smearing effect is eliminated to a great extent. It is noted that this cause of the smearing effect is predominant in camera tubes of the photoconductivity type having a relatively high transverse conductivity of the photo semiconductor layer, as is the case when, for instance, lead oxide is used. When such camera tubes are involved, the application of our new method leads to the elimination of the smearing effect, for all practical purposes. The newly invented process has a marked difference from hitherto existing scanning methods. In the existing methods, the main aim is to obtain the highest possible resolution. Therefore, one tries to give the smallest possible cross section to the scanning beam at the area of impact on the storage electrode. That cross section should be, if possible, not larger than an image element, line, or spot measured on the applied television standard. In this connection, it is noted that the intensity distribution in the scanning beam cross section is not uniform, and that the beam is not sharply defined. In fact, the electron density attains a maximum at the beam axis and decreases towards the edge of the beam in the form of a bell-shaped curve. The efficient beam cross section, and hence the width of the scanned line, are determined by the extent to which the central part of the beam succeeds in forcing the discharge of the storage electrode which is swept by the beam.

A possible way to proceed in the practical application of the present method is to enlarge the cross section of the beam. This must be done to an extent that the scanning beam may now also cover points of the storage electrode between the scanned lines of a partial picture, thereby neutralizing their charge. In its outlined form, however, that approach is not applicable for it reduces the resolution in the direction of the lines to an undesirable degree.

A specific method within the context of the present invention takes care of that deficiency. In order to avoid the loss of resolution, the cross section of the scanning beam and, therefore, the scanning spot are expanded vertically, perpendicular to the direction of the lines rather than along the direction of the lines. The cross section of the beam and the shape of the spot can take, for instance an elliptical shape, instead of the normal essentially circular form. At the present state of deflection techniques, it is difficult to maintain the desired shape and the desired position of the scanning spot at all places of the storage electrode.

According to another embodiment of the invention, in its usual radially symmetrical form, the scanning beam is deflected in addition to the horizontal direction also in a vertical direction. The vertical deflection is periodical, rather small and takes place at a frequency considerably higher than the highest video frequency repetition rate. What is obtained by the vertical deflection or oscillation of the scanning beam is that it covers not only the scanned line, but also the space between the lines.

Isolation of the sweep wobbling oscillations from the picture signal amplifier is recommended; otherwise, the amplifier may be overdriven by oscillations at the wobbling frequency. To avoid this, a filter can be used between the signal electrode of the camera tube and the input of the preamplifier. In the simplest case, this filter may be an inductance so chosen as to resonate at a frequency somewhat higher than the wobbling frequency.

A preferred method for carrying out this invention while retaining a scanning beam in the usual radially symmetrical cross section is the following. The picture of the object to be televised is distorted on the storage electrode on which it is projected, and it is distorted in such a way that the picture becomes smaller in only the vertical direction. How this preferred embodiment is accomplished is described in detail with particular reference to the drawings.

This invention has as an object the provision of methods for reducing smearing effect which results from image redrawing or image carryover between successive picture transmissions by sweeping linear scanning areas and concurrently sweeping adjacent portions of other adjacent linear scanning areas for reducing leakage of charge differential between one scanning area and adjacent portions of another area.

This invention has as another object the provision of a preferred method for accomplishing the broad object, which comprises anamorphically projecting an image on a photosensitive surface of a storage camera, whereby image aspect ratio is proportionately increased with respect to cross sectional dimension of the scanning beam.

Further objects of this invention are the provision of beam wobbling and distorting methods sweeping linear scanning areas as well as adjacent portions of other linear scanning areas.

This invention has as another object the provision of anamorphic lens systems in television cameras for anamorphically projecting images on photosensitive surfaces of the cameras.

These and further objects of the invention will be apparent from the specification including the claims and all of the written material as well as from the drawings, which together with the specification form the disclosure of the present invention.

DETAILED DESCRIPTION OF THE DRAWINGS

Figure 1:
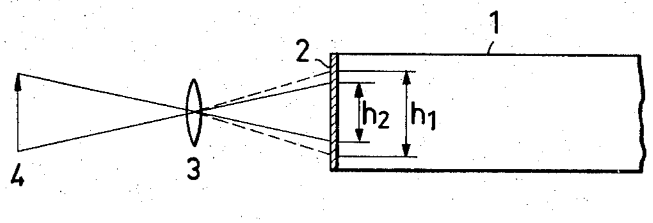
FIG. 1 is a diagrammatic representation of a television camera arrangement suitable for the application of the invention.

In FIG. 1 numeral 1 generally indicates a storage camera tube of the photoconductivity type. The photosensitive surface 2 is on the inner side of the face plate. Preferably this surface is coated with lead oxide, because the process of the present invention is especially advantageous in camera tubes of that type, which are known as plumbicon tubes. In the conventional arrangement of FIG. 1, lens 3 projects an undistorted picture of the object 4 to be televised on the photosensitive surface 2. A rectangular segment of that object is scanned, with a conventional picture aspect ratio or width to height ratio of 4 to 3. The scanning of the picture by an electron beam of the picture tube 1 is done conventionally in horizontal direction, corresponding to the picture width $b$, as indicated schematically in FIG. 2.

Figure 2:
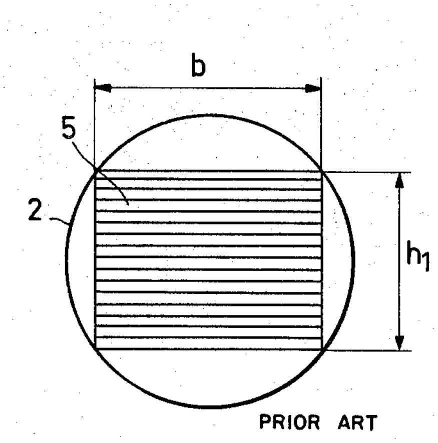
PRIOR ART Fig. 2
FIG. 2 presents an elevation view towards the face plate of the camera tube with the definition of the projected picture as it appears in a conventional manner.
Figure 3:
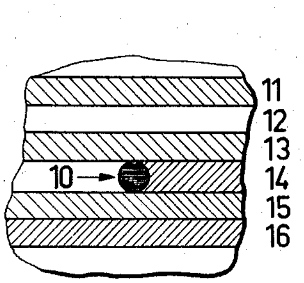
PRIOR ART Fig. 3
FIG. 3 is a segment of the line-scanning pattern of FIG. 2.
Figure 5:
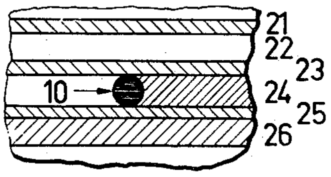
FIG. 5 is a segment of the line-scanning pattern of FIG. 4.

FIG. 3 shows a segment of FIG. 2. During a partial picture period, while scanning according to the interlaced scanning method, the scanning spot 10 sweeps every second line, e.g., lines 12, 14 and 16 and neutralizes the charge stored on the photosensitive surface. Behind the scanning spot 10 the parts of the photosensitive layer which have been swept by the scanning spot have therefore uniform potential. On the other hand, between the already scanned lines those parts of the photosensitive surface, which will be scanned only in the next half image period still contain the full charge distribution which is created by the brightness distribution of the picture. As mentioned above, the charge in the unscanned lines is partially leaked or transmitted to the already scanned lines, e.g., line 12 and a part of line 14 in FIG. 3, as a result of the transverse conductivity of the photosensitive surface. From the residual migrated charge a second weaker signal results during the following scanning period. This phenomenon, which is repeated during the following scanning periods, while gradually fading, has been identified as one of the causes of the annoying smearing effect.

Figure 4:
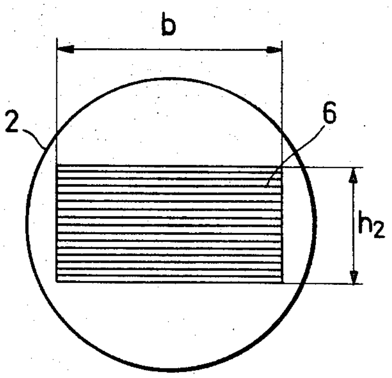
FIG. 4 is a front elevation of the face plate of a camera tube with the definition of the projected picture as it appears under the distortion of the preferred method of the invention.

The conventional lens 3 (FIG. 1) projects an undistorted picture of the object to be transmitted with a picture height $h_1$. Instead of the conventional lens 3, the invention employs another kind of lens, which distorts the picture projected on the photosurface in such a way, that it is compressed in a vertical direction. The height of the scanning pattern is scaled down in the same ratio, so that it is $h_2$, shown in FIGS. 1 and 4. The amplitude of vertical deflection for the scanning electron beam is adjusted accordingly, so that the scanning pattern in FIG. 4 shows only the smaller height $h_2$, while width and amplitude of the horizontal deflection remain unchanged. The picture can for example be distorted in vertical direction in the ratio of 3 to 2. Accordingly the aspect ratio of the scanning pattern, $b$ to $h_2$, will be 4 to 2 or 2 to 1 in comparison to the conventional $b$ to $h_1$ of 4 to 3.

With unchanged from and dimension of the scanning spot 10, the same resolution is obtained as with scanning of the undistorted picture according to FIGS. 2 and 3, because the width b of the scanning pattern remains the same. But now, because of the smaller distance between the scanned line 22 and the already scanned part of line 24, the charge remaining between those lines in lines 21 and 23 is reduced. And therewith is equally reduced the residual charge, which migrates to and develops in the already scanned lines because of the transverse conductivity of the photosurface. The annoying smearing effect is reduced to the same extent.

In the following example reduction of the smearing effect has been shown. Using a camera tube with lead oxide film, vertically distorting or shrinking the picture in a ratio of 3 to 2, and correspondingly changing the size of the scanning pattern from 4 by 3 to 4 by 2, the residual signal is reduced to less than 3 percent of the signal value during the first scanning. Normally, this residual signal amounts to 10 percent of the signal during the first scanning. The smearing effect is reduced to the same extent and is no longer annoying in the reproduction of pictures.

What is claimed is:

1. The method for reducing smearing effects in photoconductivity type storage picture tubes having storage areas which are exposed to light pattern images and which have linear scanning areas, which are successively scanned with a scanning beam, comprising sweeping a first linear scanning area in a storage area with a beam producing on the scanning area a moving spot having an effective dimension transverse to a linear direction of the first linear scanning area greater than a transverse dimension of the first linear scanning area and simultaneously sweeping at lease one closely adjacent portion of at least one adjacent linear scanning area with the moving spot, thereby discharging the first area and the adjacent portion and reducing leakage of charge differential from said adjacent portion to said first linear scanning area after the first linear scanning area has been swept.

2. The method for reducing smearing effects of claim 1 wherein the linear scanning areas comprise first and second linear scanning areas in first and second interlaced fields, and wherein the sweeping steps comprise sweeping a first linear scanning area in a first field with the moving spot and simultaneously sweeping adjacent portions of second linear scanning areas in the second field, with the spot, thereby reducing leakage of charge differential from the first linear scanning area to the adjacent portions of the second linear scanning areas after the first linear scanning area has been swept.

3. The method for reducing smearing effect of claim 1 wherein the sweeping steps comprise sweeping the first linear scanning area with a beam having a greater cross section at its incidence on the storage area than transverse dimensions of the linear scanning areas.

4. The method for reducing smearing effect of claim 1 further comprising anamorphically projecting an image on a storage layer, and reducing vertical image size, increasing scanning area aspect ratio, wherein the sweeping further comprises maintaining normal size of the moving spot at the incidence of the beam and storage layer, and thereby reducing a ratio of vertical picture size compared to corresponding vertical spot size.

5. The method for reducing smearing effect according to claim 1 further comprising vertically reducing an image of an object to be televised and projecting the image on the storage layer, and vertically reducing scanning lines while retaining scanning spot size and while retaining image dimensions in a horizontal direction, which is in the direction of the lines, thereby reducing a ratio of vertical picture size compared to vertical spot size.

6. The method for reducing smearing effect of claim 5 wherein projecting the image comprises anamorphically projecting the image on the storage layer.

7. The method for reducing smearing effect according to claim 1, wherein the sweeping comprises sweeping with a scanning beam and scanning spot larger vertically than horizontally.

8. The method for reducing smearing effect according to claim 1, characterized by periodically deflecting of the scanning beam vertically to the line (horizontal) direction at a wobbling frequency substantially higher than the highest video frequency.

9. In a television camera system having a camera storage tube, a photosensitive image receiving surface mounted on the storage tube, and beam producing and scanning apparatus connected thereto for conventionally directing a beam in successive passes over the photosensitive surface, and lens means for projecting an image of an object to be televised on the photosensitive surface, the improvement comprising an anamorphic lens mounted adjacent the photosensitive surface for anamorphically projecting an image on the photosensitive surface means to reduce amplitude of vertical deflection of the beam, and means to maintain vertical dimension of a scanning spot produced by the beam on the scanning surface, thereby causing the beam to expose and discharge adjacent portions of second linear scanning areas, as well as first linear scanning areas for preventing leakage from the adjacent portions to the first area after it has been scanned, exposed, and discharged.

10. Television camera apparatus comprising a camera storage tube, a photosensitive image receiving surface mounted on the storage tube, beam producing means connected to the storage tube for producing a beam having a spot on the image receiving surface, scanning means connected to the storage tube for moving the beam and spot along parallel linear areas on the image receiving surface, first along spaced parallel linear areas in a first field and then along spaced parallel linear areas of a second field interposed between linear areas of the first field, and means for simultaneously moving the spot along adjacent portions of linear areas in one field when moving the spot along linear areas in another field, thereby discharging the adjacent portions and preventing charge leakage from the adjacent portions to linear areas in said another field.

11. The apparatus of claim 10 wherein the means for moving the spot along adjacent portions comprises means for relatively increasing spot dimension with respect to transverse dimension of linear areas.

12. The apparatus of claim 10 wherein the means for relatively increasing spot dimension comprises anamorphic lens connected to the tube for anamorphically projecting an image on the receiving surface, relatively decreasing image size transverse to the linear areas.

* * * * *